United States Patent [19]

Rucklidge et al.

[11] Patent Number: 5,999,653

[45] Date of Patent: Dec. 7, 1999

[54] FAST TECHNIQUES FOR SEARCHING IMAGES USING THE HAUSDORFF DISTANCE

[75] Inventors: William J. Rucklidge, Mountain View; Eric W. Jaquith, Belmont, both of Calif.

[73] Assignee: Xerox Corporation, Stamford, Conn.

[21] Appl. No.: 08/633,240

[22] Filed: Apr. 16, 1996

Related U.S. Application Data

[60] Provisional application No. 60/010,243, Jan. 19, 1996.

[51] Int. Cl.$^6$ ............................................. G06K 9/70
[52] U.S. Cl. ................................... 382/227; 382/257
[58] Field of Search .............................. 382/226, 227, 382/228, 224, 308, 217, 218–221, 209, 257

[56] References Cited

U.S. PATENT DOCUMENTS

| | | | |
|---|---|---|---|
| 3,845,466 | 10/1974 | Hong | 382/228 |
| 4,030,068 | 6/1977 | Banz | 382/227 |
| 5,347,595 | 9/1994 | Bokser | 382/227 |
| 5,361,379 | 11/1994 | White | 382/227 |
| 5,465,167 | 11/1995 | Cooper et al. | 358/468 |

OTHER PUBLICATIONS

Anil K. Jain, *Fundamentals of Digital Image Processing*, Prentice–Hall, 1989 pp. 384–389.

Rames Jain, Rangachar Kasturi and Brian G. Schunck, Machine Vision, McGraw–Hill, 1995, pp. 482–483.

Using Paperworks from a Fax Machine User's Manual, Xerox Corp., 1992.

William J. Rucklidge, "Efficiency Computation of the Minimum Hausdorff Distance for Visual Recognition", Ph. D. Dissertation, Cornell University, Jan. 1995.

Todd A. Cass, "Feature Matching for Object Localization in the Presence of Uncertainty", Proceedings of the Third International Conference on Computer Vision (IEEE), 1990, pp. 360–364.

Daniel P. Huttenlocher, Klara Kedem and Micha Sharir, "The Upper Envelope of Voronoi Surfaces and Its Applications", *Discrete and Computational Geometry*, 1993, vol. 89, pp. 267–291.

Daniel P. Huttenlocher and Klara Kedem, "Computing the Minimum Hausdorff Distance for Point Sets Under Translation", Proceedings of the Sixth Annual Symposium on Computational Geometry (ACM), pp. 340–349.

William J. Rucklidge, "Locating Objects Using the Hausdorff Distance", Proceedings of the Fifth International Conference on Computer Vision (IEEE), Jun. 1995, pp. 457–464.

(List continued on next page.)

*Primary Examiner*—Amelia Au
*Assistant Examiner*—Larry J. Prikockis

[57] ABSTRACT

Fast, low-overhead implementations of a powerful, reliable image matching engine based on the Hausdorff distance are disclosed. In one such implementation, a method is provided in which a processor receives two inputs. The first input is a pattern to be recognized in an image; the second, a digital image in which the pattern is to be recognized. The digital image is preprocessed with the processor using various morphological dilation operations so as to produce a set of preprocessed digital images. Thereafter, the processor performs a hierarchical search for the pattern in the digital image. The hierarchical search is performed over a search space, and includes a series of decisions, each decision indicating whether a portion of the search space can be eliminated from the search. Each decision is made by performing a plurality of comparisons between the pattern and the preprocessed digital images of the set and analyzing the results of these comparisons. Once the search is complete, the processor outputs a search outcome indicating, for example, whether (and where) the pattern has been found in the image. Any application domain wherein images are searched for instances of patterns can benefit from this invention. Document analysis applications provide one such domain.

23 Claims, 3 Drawing Sheets

OTHER PUBLICATIONS

Daniel P. Huttenlocher and William J. Rucklidge, "A Multi-resolution Technique for Comparing Images Using the Hausdorff Distance", Proceedings Computer Vision and Pattern Recognition '93 (IEEE), Jun. 1993, pp. 705–706.

Thomas M. Breuel, "Fast Recognition using Adaptive Subdivisions of Transformation Space", Proceedings Computer Vision and Pattern Recognition '92(IEEE), Jun. 1992, pp. 445–457.

Product Brochure for Automated Data Entry System, GTESS Corp., 1995.

Product Brochure for OCR for Forms, Microsystems Technology, Inc., 1995.

Product Brochure for ELA Forms Processing, Com Com Systems, Inc., 1995.

Product Brochures for KIPP Image Controls and KIPP Image Processing Modules, Kofax Image Products, 1995.

Product Brochure for StageWorks Office for PaperClip, 1995.

Product Brochure for Omnitools 2.0, Nestor, 1995.

You et al., "A Hierarchical Image Matching Scheme Based on the Dynamic Detection of Interesting Points" pp. 2467–2470 1994.

Huttenlocher, Daniel P. and William J. Rucklidge, "A Multi-Resolution Technique for Comparing Images Using the Hausdorff Distance," TR 92–1321, Dec. 1992, Department of Computer Science, Cornell University, Ithaca, NY.

Russ, The Image Processing Handbook, 1994, CRC Press, pp. 433–436.

| $\sqrt{5}$ | 2 | $\sqrt{5}$ | $2\sqrt{2}$ | $\sqrt{10}$ |
|---|---|---|---|---|
| $\sqrt{2}$ | 1 | $\sqrt{2}$ | 2 | $\sqrt{5}$ |
| 1 | 0 | 1 | 1 | $\sqrt{2}$ |
| $\sqrt{2}$ | 1 | 1 | 0 | 1 |
| $\sqrt{5}$ | 2 | $\sqrt{2}$ | 1 | $\sqrt{2}$ |

| 1 | 1 | 2 | 2 | $\sqrt{5}$ |
|---|---|---|---|---|
| 0 | 0 | 1 | 1 | $\sqrt{2}$ |
| 0 | 0 | 0 | 0 | 1 |
| 1 | 1 | 0 | 0 | 1 |
| 2 | 2 | 1 | 1 | $\sqrt{2}$ |

FIG. 4D

FIG. 4E ered, 1996 by the same inventors and
FAST TECHNIQUES FOR SEARCHING IMAGES USING THE HAUSDORFF DISTANCE Priority is claimed from a U.S. provisional application No. 60/010243 filed Jan. 19, 1996 by the same inventors and assignee.

BACKGROUND OF THE INVENTION

General Background

This invention relates to image processing methods and more particularly to methods of detecting a known pattern or model in an unknown image.

Suppose that we have an engineering diagram containing a number of symbols of known shape. Such a symbol can be, for example, a circle with a cross through it indicating where a drill press should place holes in a part being fabricated. Suppose further that we want to use a computer or image processing device automatically to determine the locations of these symbols.

To solve this problem, we can begin by scanning the paper diagram with a scanner to produce into a digital image that is suitable for processing by the computer or image processing device. Then the computer can search the digitized image for a pattern of bits that corresponds to the symbols. The computer then outputs a message to notify us of its finding, or perhaps automatically takes an action (e.g., a computer-controlled drill press might automatically drill holes in the part at the determined locations) based on its finding.

This problem is more complicated in practice than it might at first appear. There can be many such symbols on any given diagram, and each diagram can be quite large. Moreover, the digital (scanned) image of the diagram may be of poor quality due to, for example, FAX transmission, multiple generations of photocopying, user-added marks such as deliberate hand-written annotations as well as stray or erroneous marks, skewed image produced by misalignment of paper and scanner, etc., etc. The appearance of each symbol can therefore deviate significantly from its ideal appearance; nevertheless, we want to locate each symbol reliably and efficiently.

Known methods of finding patterns include using Hausdorff distance matching of binary images. For example, see the references [HR93], [Ruc95a], and [Ruc95b] (described more fully in the Background References section immediately below). The Hausdorff distance is a function that measures the similarity between two point sets. It is a reliable measure of similarity even when the points in the sets have been perturbed or deleted, when noise points have been added, and when one set corresponds only to a small subregion of the other set. These properties make it useful for document analysis, among other tasks. However, known methods for its computation are not as fast or as memory-efficient as is desired. That is, the known methods require computation times and memory resources that are excessive, even prohibitive, in certain application domains. Accordingly, better methods are needed.

Background References

[HR93] D. P. Huttenlocher and W. J. Rucklidge. A multi-resolution technique for comparing images using the Hausdorff distance. In *Proc. Computer Vision and Pattern Recognition*, pages 705–706, New York, N.Y., 1993.

[Ruc95a] W. J. Rucklidge. *Efficient Computation of the Minimum Hausdorff Distance for Visual Recognition*. PhD thesis, Cornell University, January 1995.

[Ruc95b] W. J. Rucklidge. Locating objects using the Hausdorff distance. In *Proc. Fifth International Conference on Computer Vision*, pages 457–464, Cambridge, Mass., June 1995.

Technical Background

Problem Statement

Locating an instance of a binary pattern within a binary image is a task that is useful in image understanding: the pattern might represent a part in an engineering diagram, a character template in an OCR application, an object in a tracking application, a query in an image-based indexing application, etc. The pattern and the image can both be considered to be a set of points lying in the plane; alternately, they can both be considered to be binary bitmaps.

There are a number of factors that make this task difficult:
1. The image is unlikely to contain a perfect instance of the pattern; instead, it will contain a version of the pattern that is distorted in a number of ways. The points of the true pattern can be moved from their nominal positions, some points may be missing entirely, and there may be extraneous points.
2. The image can also contain other things than just an instance of the pattern, such as other characters or objects.
3. The position in the image of the instance of the pattern is unknown.

The problems in item 1 can be overcome using the Hausdorff distance. The Hausdorff distance between two sets, P representing the pattern and I representing (a portion of) the image is composed of two parts: the forward Hausdorff distance h(P,I) and the reverse Hausdorff distance h(I,P), where $$h(A, B) = \max_{a \in A} \min_{b \in B} \|a - b\| \qquad (1)$$

and $\|\cdot\|$ is some norm in the plane, usually the $L_2$ norm. Thus h(P, I) is calculated by considering each point in the pattern P and locating the closest point in the image I, and taking the largest of these values; h(I,P) is calculated analogously. When h(P,I) and h(I,P) are both small, then the image and the pattern match well. However, a single pattern point far from any image point, or image point far from any pattern point, can make h(P,I) or h(I,P) large, even if they otherwise match well. In practice, therefore, we use $$h^f(A, B) = f^{th}_{a \in A} \min_{b \in B} \|a - b\| \qquad (2)$$

where $f_{x \in X}^{th} g(x)$ denotes the f-th quantile value of g(x) over the set X, for some value of f between zero and one. For example, the 1-th quantile value is the maximum and the ½-th quantile value is the median. We use two separate fractions $f_F$ and $f_R$ to compute the partial forward Hausdorff distance $h^{f_F}(P,I)$ and the partial reverse Hausdorff distance $h^{f_R}(I,P)$; these are much more reliable indicators of a match between the pattern and the image.

Item 2 can be dealt with by moving the reverse distance: instead of computing $h^{f_R}(I,P)$ using every point in I, we use only those "close to" P, and ignore the rest, as ones far from the patters are likely to be part of other, unrelated, image objects. Specifically, we use only the points of I lying underneath the bounding box of P. We denote this modified partial reverse Hausdorff distance by $h_{box}^{f_R}(I,P)$.

Item 3 is the hardest problem to solve. We have to search some space of transformations of the pattern, finding the transformation where the partial forward and reverse Hausdorff distances are small. The space of transformations can be simply the space of translations (as would be the case in an OCR system where the size and orientation of the characters were already known), or a more complex space such as the space of affine transformations (this is suitable for applications involving recognition of objects in three-dimensional scenes). For purposes of discussion, we will refer to searching only the space of translations; however, it will be appreciated that the search methods can also be applied to other transformation spaces using, for example, the techniques in [Ruc95a].

Two functions representing the forward and reverse Hausdorff distances as a function of the translation t are now defined by $$d(t) = h^{fF}(t(M), I) \quad (3)$$

$$d'(t) = h_{box}^{fR}(I, t(M)) \quad (4)$$

We search the space of translations $t=(t_x, t_y)$ of the pattern, within bounds $t_x^{min} \leq t_x \leq t_x^{max}, t_y^{min} \leq t_y \leq t_y^{max}$. These bounds can either be set by the user, or deduced by the search system based on the size of the pattern and the image. We consider only the translations within these bounds whose coordinates are integral, representing a translation of the pattern bitmap by an integral number of pixels over the image bitmap.

We set two thresholds $\tau_F$ and $\tau_R$ and find all translations satisfying two criteria:

Forward criterion The partial forward distance, d(t) (implicitly parameterised by $f_F$) must be no more than the forward threshold $\tau_F$.

Reverse criterion The partial box-reverse distance, d'(t), (parameterised by $f_R$) must be no more than the reverse threshold $\tau_R$.

$f_F$, $f_R$, $\tau_F$ and $\tau_R$ are set by the user to control which translations are reported. A translation satisfying both the forward and reverse criteria is called a match. The task of the system is now to report all matches; these represent the locations of the pattern in the image (when the parameters are set correctly).

Search Criteria

It is useful to rephrase the forward and reverse criteria in terms of the Hausdorff fraction rather than the Hausdorff distance. The Hausdorff fraction for a given translation t is $$f(t) = \frac{\#\left(\left\{p \in P \mid \min_{i \in I} \|p + t - i\| \leq \tau_F\right\}\right)}{\#(M)} \quad (5)$$

where #(S) is the number of elements in the set S. This function, which is implicitly parameterised by $\tau_F$, is the fraction of all the model points that, when translated by t, lie within $\tau_F$ of some image point. f'(t) can be defined similarly: it is the fraction of the image points that lie within $\tau_R$ of some model point, out of the image points lying underneath the translated model box (i.e., out of the image points contributing to the box-reverse distance).

The forward and reverse criteria can now be expressed in terms of f(t) and f'(t):
Forward criterion f(t) must be at least $f_F$.
Reverse criterion f'(t) must be at least $f_R$.
These new formulations are exactly equivalent to the original ones: from the definition of the partial Hausdorff distance, $d(t) \leq \tau_F$ exactly when $f(t) \geq f_F$, and similarly for d' and f'.

The Box Distance Transform

In concept, we could now evaluate f(t) and f'(t) for every t, but this would be hopelessly slow. However, failing to locate a match when there is one is not acceptable, so every translation must be considered to some degree. We have developed a number of techniques that allow us to locate all matches, guaranteeing that none will be missed, while explicitly considering only a relatively small number of translations. These techniques prune the space of translations based on the forward criterion.

Let $$\Delta[x, y] = \min_{i \in I} \|(x, y) - i\|. \quad (6)$$

be the distance transform of the image I. $\Delta[x,y]$ is the distance from (x,y) to the closest point of I. Let w and h be any positive values, and define the box distance transform of I $$\Delta'_{wh}[x, y] = \min_{\substack{0 \leq x' < w \\ 0 \leq y' < h}} \Delta[x + x', y + y']. \quad (7)$$

where values of $\Delta$ lying outside the image bounds are considered to be infinite.

Now consider a translation $t=(t_x, t_y)$. For each point $p=(p_x, p_y) \in P$, look at $\Delta'_{wh}[t_x+p_x, t_y+p_y]$, and count the number of these values that are no greater than $\tau_F$. If this number is smaller than $f_F \#(P)$, then no translation in the range $[t_x \ldots t_x+w-1, t_y \ldots t_y+h-1]$ can possibly satisfy the forward criterion. To see this, suppose that some translation t' in this range did satisfy the forward criterion. Consider the values of $\Delta[t'_x+p_x, t'_y+p_y]$ for $(p_x, p_y) \in P$. At least $f_F \#(P)$ of the points of P must yield values below $\tau_F$ for the forward criterion to be satisfied. Now, take any such point $(p_x, p_y)$, and look at $\Delta'_{wh}[t_x+p_x, t_y+p_y]$. This must be no larger than $\tau_F$, since $\Delta[t'_x+p_x, t'_y+p_y]$ is one of the values that were minimised to compute $\Delta'_{wh}[t_x+p_x, t_y+p_y]$. Therefore the fraction of the $\Delta'$ values examined that were no greater than $\tau_F$ must be $f_F$ or more.

The Hierarchical Search

This observation can be used to generate a fast recursive pruning search that operates as follows:

Divide transformation space into rectangular blocks (all of the same size).

Compute $w_1$, $h_1$ and $\Delta'_{w1h1}$ based on the size of these blocks. This is the top level of the recursion (recursion level 1).

Examine each block to see if it can be pruned out, by looking at the values of $\Delta'_{wihi}[t_x+p_x, t_y+p_y]$ (where i is the current recursion level) for each point $(p_x, p_y) \in P$ and for $(t_x, t_y)$ set to the upper left transformation in each block.

Subdivide and recursively consider the remaining block (those blocks that cannot be entirely ruled out), until each block contains only a single translation. We typically set $w_{i+1}=w_i/2$ and $h_{i+1}=h_i/2$, but we use other subdivision strategies in some cases.

At the bottom of the recursion, $w_i=h_i=1$ and so the box distance transform is the same as the regular distance transform, and the rectangles cannot be subdivided further. These remaining translations are exactly those that satisfy the forward criterion; checking each to see if it satisfies the reverse criterion is now easy (since no search needs to be done).

This process is quite efficient, in terms of the number of translations actually considered, but has a large amount of overhead: $\Delta$ must be calculated, and once it has been calculated, a number of box distance transforms must be calculated (one for each rectangular block size that is encountered during the search). The computation of $\Delta$ is quite expensive; it is also expensive in terms of memory (each [x,y] location may contain a value with a fairly large range, and there must be as many such locations as pixels in the image I, or possibly more). Computing the box distance transforms from Δ is also expensive, and they each occupy a similar amount of memory.

The memory used by the box distance transforms can be reduced by noting that the values probed from $\Delta'_{w,h}$ are compared against $\tau_F$, and the binary results of these comparisons are then used; the exact values are not important, just whether or not they exceed $\tau_F$. We can therefore threshold each box distance transform as it is being generated, saving memory.

SUMMARY OF THE INVENTION

The invention enables very fast (on the order of tens of milliseconds), low-overhead implementations of a powerful, reliable image matching engine. Any application domain wherein images are searched for instances of patterns can benefit from this invention. Document analysis applications provide one such domain.

In one aspect, the invention provides a method in which a processor receives two inputs. The first input to the processor is a pattern to be recognized in an image. The second input to the processor is a digital image in which the pattern is to be recognized. The digital image is preprocessed with the processor using various morphological dilation operations so as to produce a set of preprocessed digital images. Thereafter, the processor performs a hierarchical search for the pattern in the digital image. The hierarchical search is performed over a search space, and includes a series of decisions, each decision indicating whether a portion of the search space can be eliminated from the search. Each decision is made by performing a plurality of comparisons between the pattern and the preprocessed digital images of the set and analyzing the results of these comparisons. Once the search is complete, the processor outputs a search outcome indicating, for example, whether (and where) the pattern has been found in the image.

In another aspect, the invention provides a method in which a processor receives two inputs. The first input to the processor is a pattern to be recognized in an image. The second input to the processor is a digital image in which the pattern is to be recognized. The digital image is preprocessed with the processor so as to produce a set of preprocessed digital images. Thereafter, the processor performs a hierarchical search for the pattern in the digital image. The hierarchical search is performed over a search space, and includes a series of decisions, each decision indicating whether a portion of the search space can be eliminated from the search. Each decision is made by performing a plurality of nonpointwise comparisons between the pattern and the preprocessed digital images of the set and analyzing the results of these comparisons. The comparisons for each decision are performed in an order dependent on a density ordering of the pattern, with the results of early comparisons for the decision being used to determine whether later comparisons need to be performed at all. Once the search is complete, the processor outputs a search outcome indicating, for example, whether (and where) the pattern has been found in the image.

In still another aspect, the invention provides a method in which a processor receives two inputs. Once again, the first input to the processor is a pattern to be recognized in an image, and the second input to the processor is a digital image in which the pattern is to be recognized. The digital image is preprocessed with the processor so as to produce a single dilated digital image. A set of densities is computed for the dilated image. Thereafter, the processor performs a nonhierarchical search for the pattern in the image. For each transformation included in the search space, the processor performs a density check based on the set of densities. If and only if the density check is satisfied for the particular transformation, the processor performs a plurality of comparisons between the pattern and the dilated digital image and analyzes the results of these comparisons. Again, once the search is complete, the processor outputs a search outcome indicating, for example, whether (and where) the pattern has been found in the image.

The invention will be better appreciated from the detailed description and accompanying drawings.

DETAILED DESCRIPTION OF SPECIFIC EMBODIMENTS

Overview

Figure 1:
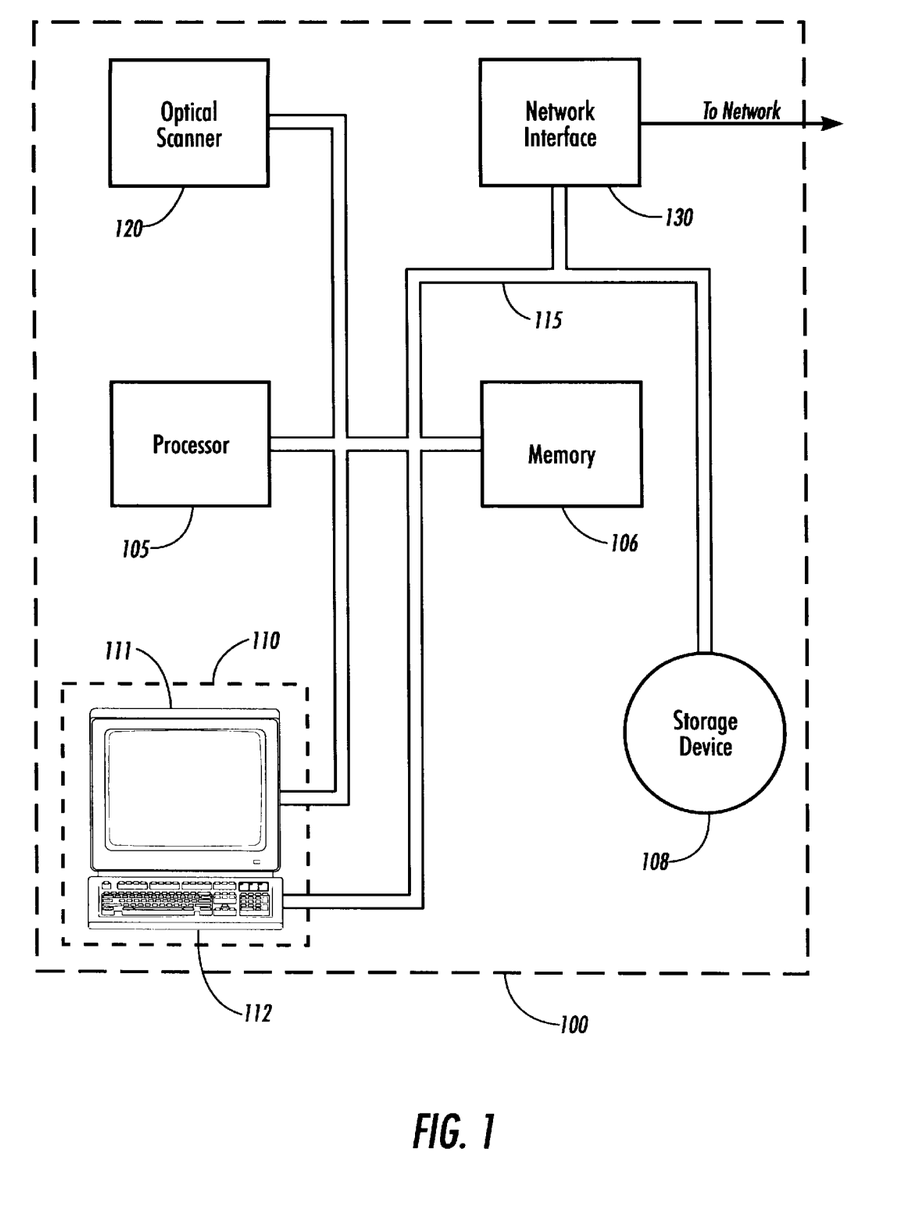
FIG. 1 illustrates a hardware configuration suitable for embodying the invention.

In the embodiments that will now be described, the invention is practiced in a general-purpose computer or a dedicated image processing device such as a "smart" digital photocopy machine. FIG. 1 shows an exemplary hardware configuration comprising a system 100 (e.g., a personal computer, a work-station, or a "smart copier") that includes a processor 105 (e.g., a micropro-cessor or other CPU; this could also be a collection of multiple cooperating processors operating in parallel), a working memory 106 (e.g., random access memory), a persistent storage device 108 (e.g., a hard disk), and user interface components 110 including a visual display monitor 111 (e.g., a CRT or flat-panel display) and an input mechanism 112 (e.g., a console with a keyboard and a pointing device such as a mouse, trackball, or the like). These components communicate with one another over a common interface 115 (e.g., a bus). System 100 further includes one or more sources of image data, such as scanner 120 and network interface 130 which can be connected to a local-area or wide-area network such as the Internet (not shown).

In operation of the invention, digital image data, such as a binary bitmapped image scanned with scanner 120 or obtained from a network via network interface 130 or previously stored on persistent storage device 108, is placed in a section of working memory 106 and thus made available to processor 105. Processor 105 then executes a software program (typically stored in another section of working memory 106) by which processor 105 carries out the method of the invention on the image data.

The hardware configuration will be well-understood by those of skill in the art, and many variations and adaptations of the hardware will be apparent. Accordingly, the remainder of the description focuses on the software and the theoretical underpinnings of the method of the invention.

Figure 2:
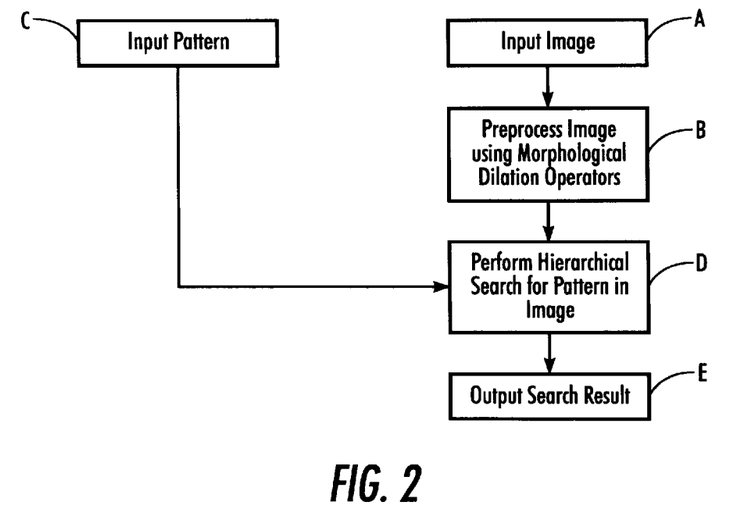
FIG. 2 illustrates a flowchart of image-pattern matching in a first embodiment of the invention.

FIG. 2 shows a high-level flowchart of how a pattern can be found in an input image according to the method of the invention in a first embodiment. The input image is made available to and received by the processor (step A) and is preprocessed using morphological dilation operators as will be described more fully below (step B). The use of morphological operators at this step is new to the present invention.

Also, the pattern that is to be searched for in the input image is made available to and received by the processor (step C). The pattern should preferably be comparable in format to the input image; thus, if the input image is a binary bitmapped image, the pattern is preferably also a binary bitmap, having length and width dimensions less than or equal to those of the input image.

The pattern and image can be, for example, binary pixel arrays (that is, arrays of pixels that can be either zero or nonzero, and thus white or black).

Thereafter, a search is made to attempt to find occurrences of the pattern in the input image (step D). In this first embodiment, the search is a hierarchical search. That is, the search space can be represented abstractly as a tree or hierarchy. The tree represents a recursive subdivision of transformation space, with each tree node representing a block of transformations, and each of its children nodes representing a subpart of that block. At each stage of the search, the processor makes a comparison to decide whether to explore further down the current branch of the tree, or whether to stop and go on to the next branch. For a binary image and pattern, this decision can be based on a pointwise measurement of the nonzero (black) pixels in the pattern. In particular, the comparison is based on Hausdorff matching as will be described. The particular Hausdorff matching technique used is very fast and memory-efficient, and is new to the present invention. According to the invention, comparisons between image and pattern can be performed on a word-wise rather than a pointwise basis, and each comparison is performed beginning with denser regions of the pattern, thus tending to determine early on in the image-to-pattern comparison that there is no match, so that the branch can readily be pruned from the search space.

Once the search is complete, the search results are output by the processor (step E). For example, the processor can display the result on the display monitor. More typically, the search results are stored in working memory and used to trigger or control subsequent computations. For example, if the search succeeds and the pattern is found in the image, then the processor can perform a first set of subsequent computations or set in motion a first chain of subsequent events; if the search fails and the pattern is not found in the image, the processor can perform a second set of subsequent computations or set in motion a second chain of subsequent events.

Figure 3:
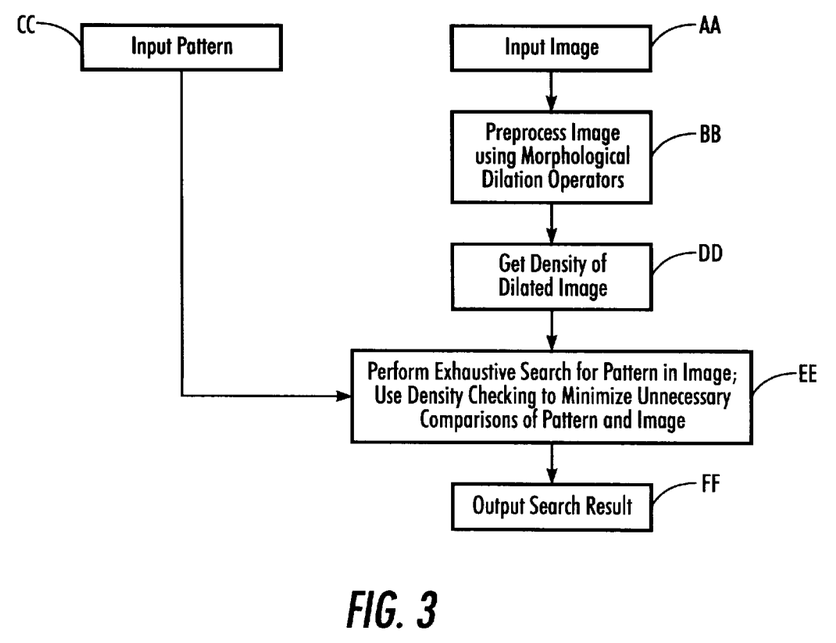
FIG. 3 illustrates a flowchart of image-pattern matching in a second embodiment of the invention.

FIG. 3 shows a high-level flowchart of how a pattern can be found in an input image according to the method of the invention in a second embodiment. This embodiment can be more memory-efficient than the first embodiment, and thus can be particularly appropriate where the available capacity of working memory is limited.

As in the first embodiment, the input image is made available to and received by the processor (step AA) and is preprocessed using morphological dilation operators (step BB). The pattern that is to be searched for in the input image is made available to and received by the processor (step CC).

The dilated image is used to obtain a density profile (step DD) that will later be used for density checking. (In practice, to reduce memory usage, rather than computing the density profile in advance and storing it for later use, we can compute the density profile incrementally during step EE. This is described more fully below in the "Density Checking" subsection of the Technical Details section.) The density computation step, and the subsequent density checking based thereon, are new to the present invention.

Thereafter, a search is made to attempt to find occurrences of the pattern in the input image (step EE). In this second embodiment, the search is an exhaustive rather than a hierarchical search. That is, every pixel of the image is considered in turn as a potential site at which the pattern and image might be compared. However, to improve overall computational efficiency, the image and pattern are not compared at each and every pixel. Instead, an initial computation (called a density check) is performed at each pixel. The initial computation, which takes advantage of the density profile previously computed in step CC, can be performed very rapidly, and so does not add much computational overhead. The initial computation returns a result of success or failure. If and only if the initial computation result is success, a more detailed comparison of the pattern and image is made. In this way, unnecessary image-pattern comparisons are minimized. Once again, comparisons are based on the new fast Hausdorff matching techniques that will be described, and use word-wise rather than pointwise comparisons. After the search is complete, the search results are output by the processor (step FF) and again can be used as appropriate to the particular application.

With this overview in mind, the details of the method, and particularly of the preprocessing and searching steps, will now be described at length.

Method Details
Exploiting Bit-level Parallelism

Once the box distance transform of the appropriate size has been generated and thresholded, deciding if a certain rectangular area of translation space should be pruned or subdivided can be done using bit-level parallelism. Let $(t_x, t_y)$ be the upper left corner of the rectangular area and $\Delta'_{wh}$ be the box distance transform computed using the w and h values specified by the width and height of the rectangle. Define $$T'_{wh}[x, y] = \begin{cases} 1 & \text{if } \Delta'_{wh}[x, y] \leq \tau_F \\ 0 & \text{if } \Delta'_{wh}[x, y] > \tau_F \end{cases} \quad (8)$$

The pattern P can also be treated as a bitmap: $P[x,y]=1$ iff $(x,y)$ is a point in the set P. Suppose that the bitmap P is bounded by $0 \leq x < P_{w\_1}$ and $0 \leq y < P_h$. Now, the rectangular area of transformation space should be accepted (and subdivided if it is not just a single transformation) exactly when $$\sum_{\substack{0 \leq x < P_w \\ 0 \leq y \leq P_h}} T'_{wh}[x, y] P[x + t_x, y + t_y] \geq f_F \#(P)$$

or, in other words, when the number of "on" bits in the AND of $T'_{wh}[x,y]$ and $P[x+t_x, y+t_y]$ is large enough. This can be done by taking the bitmap P, shifting it by $(t_x, t_y)$, AND-ing this with the bitmap $T'_{wh}$ a machine word at a time, and counting the number of set bits in each machine word (this can be done with a table lookup, or a "population count" instruction if the processor involved has one).

However, the distance transform and box distance transform are still quite expensive to compute. We propose a method of computing the required information without explicitly finding the distance transform, and using only binary morphological operators (which can be computed using bit-level parallelism).

Analogously to the definition of $T'_{wh}$, define $$T[x, y] = \begin{cases} 1 & \text{if } \Delta[x, y] \leq \tau_F \\ 0 & \text{if } \Delta[x, y] > \tau_F \end{cases} \qquad (9)$$

which is a thresholded version of the distance transform. Now observe that $$T'_{wh}[x, y] = \bigvee_{\substack{0 \leq x' < w \\ 0 \leq y' < h}} T[x + x', y + y']$$

i.e., the value of $T'_{wh}[x,y]$ is the OR of all the bits of T in a rectangle w wide by h high whose top left corner is at (x,y). Thus, computing the thresholded box distance transform can be done by thresholding the regular distance transform and computing ORs over w by h rectangles. This is equivalent to dilating T by a structuring element that is a rectangle w by h, whose "centre" is at its lower right corner. In this formulation, the array $T'_{wh}$ is computed by replacing each "on" pixel of T with this structuring element. Dilating by a rectangular structuring element is an operation that can be implemented efficiently: it is equivalent to dilating by two structuring elements, one horizontal line w long and one vertical line h long. These smaller operations themselves can use bit-level parallelism easily.

Figure 4A:
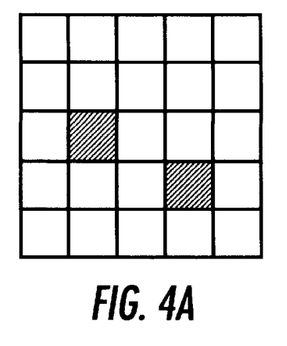
FIGS. 4A–4E are a series of views illustrating arrays used in the computations of image-pattern matching according to the invention.
Figure 4B:
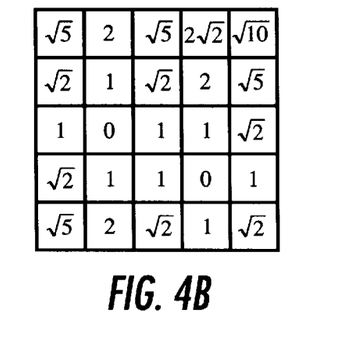
Figure 4C:
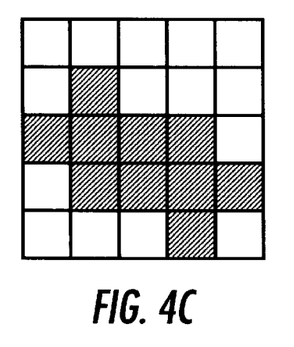
Figure 4D:
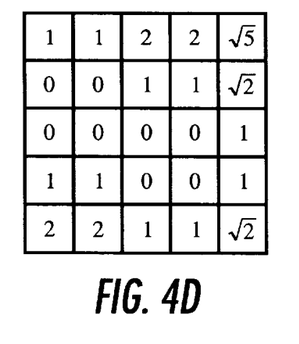
Figure 4E:
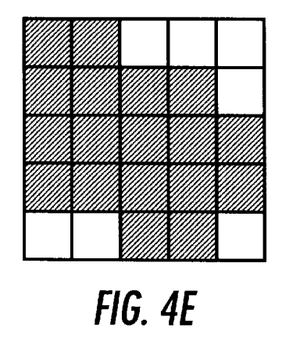

The series of views in FIGS. 4A through 4E shows examples of the various arrays defined here. FIG. 4A shows the image I. FIG. 4B shows the distance transform $\Delta$ of I. FIG. 4C shows the thresholded distance transform T for $\tau_F=1$. This can be obtained directly from I by a circular dilation of radius 1. FIG. 4D shows the box distance transform $\Delta'_{22}$ for w=h=2. FIG. 4E shows the thresholded box distance transform $T'_{22}$. This can be obtained either by thresholding $\Delta'_{22}$, or, preferably, directly from T by a dilation with a 2×2 square structuring element; this latter method is much faster.

The distance transform $\Delta$ of the image I does not need to be computed at all, since all that is needed is T, and the various $T'_{wh}$ which are computed by dilating T. T can be obtained from the image bitmap I by dilating using a circular structuring element of radius $\tau_F$. Since $\tau_F$ is usually small, this operation is not especially expensive. We can therefore perform the search using only binary operations, thus drastically reducing the memory space required, and also significantly reducing the time required. This makes it much more suitable for practical applications.

There are thus two stages of morphological operation here. In the first stage, T is computed via a morphological dilation of the image I. In the second stage, the various $T'_{wh}$ arrays needed by the hierarchical search are computed by morphological dilations of T by various rectangular structuring elements. This second stage is novel to the present invention.

Some other things can also be done to speed up the search process. When a rectangle is being evaluated to see if it should be pruned or subdivided, it is possible to reject poor translations early. For example, if we are looking for a forward match of 90% (i.e., $f_F=0.9$), and we find that 11% of the points in the first bitmap row of the translated pattern P do not match when compared to $T'_{wh}$, then we may halt further evaluation of this translation.

The comparison of P and $T'_{wh}$ can be sped up even more by considering the rows of P in sorted order, from the densest row of P down to the sparsest row. That is, we may consider the bitmap row of P with the most "on" points first. We additionally keep track of which rows of P are entirely empty (that is, the bitmap rows having no "on" points). When these empty rows of P are reached when evaluating a certain rectangle, the evaluation is complete and we terminate there; those bitmap rows need not be scanned at all, since they cannot give rise to any hits between P and $T'_{wh}$.

When ordering rows of P where P is many rows high, we may encounter some performance problems with memory cache-misses, since by changing the order in which we consider the rows of P we have reduced the locality of reference. We can solve this by dividing the bitmap of P into horizontal blocks or strips, and ordering each block by densest row first. Summing the number of on points in each block, we may then order the blocks by densest block first. Within each block, we will have good locality of reference; we are also likely to decide to terminate the scan quite early on, if that is possible.

For patterns where it will be faster to base the comparison order on the columns of P (for example, a bar code), we can rotate both P and I by 90 degrees first and progress as above.

Density Checking

In some instances, using the hierarchical search with pruning is not ideal, due either to the overhead involved in computing the thresholded box distance transform, or the memory it occupies. In these cases, we can still search efficiently using another method. Given a pattern bitmap P, a bitmap T to search for matches (recall that T is the thresholded distance transform obtained directly from a dilation of I), and $f_F\#(P)$, the minimum number of points of the translated pattern P that must correspond with points in T for a translation to satisfy the forward criterion, we attempt to minimize the number of comparisons of P and T (again, while assuring that we do not miss any translations satisfying the forward criterion).

We notice that for at least $f_F\#(P)$ of P's points to match points in T, that there must be at least $f_F\#(P)$ "on" points in the rectangular region of T over which we are placing P. Consider some translation $(t_x, t_y)$ of P. We can simply count the number of "on" points in the rectangular region described by $T[t_x \ldots t_x+P_w-1, t_y \ldots t_y+P_h-1]$. If the count is less than $f_F\#(P)$ then we know P can not possibly match T at this translation, and the actual comparison can be skipped. Thus, we may run a rectangular window of size $P_w \times P_h$ over T and will only need to compare P and T when the number of "on" points in the window is greater than $f_F\#(P)$.

In practice, we use two standard methods to speed the rectangular region summing. The first method uses a constant amount of memory to store a two dimensional counting array, C. Let $T_w$ and $T_h$ be the width and height of bitmap T. For matters of clarification and simplification, suppose that we are interested in checking all translations $(t_x, t_y)$ such that $0 \leq tx \leq T_w - P_w$ and $0 \leq t_y < T_h - P_h$, that is, where the translated pattern is completely contained in the region T. Then C will be of height $P_h+1$ and width $T_w-P_w+1$. We initialize $C[x,y]$ (for $0 \leq y < P_h$) to be the number of "on" points in $T[x \ldots x+P_w, y]$. Note that a row of C can be computed from T in $O(T_w - P_w)$ operations, by using a standard box-filter counting approach. The last row of C is set to $$C[x, P_h] = \sum_{y=0}^{P_h-1} C[x, y]$$

Thus, $C[x,P_h]$ contains the number of "on" points in the $P_w \times P_h$ window whose upper left corner is at $(x,0)$. We now scan all translations $(t_x,0)$ by checking if $C[t_x,p_H]<f_F\#(P)$. If so, we skip the comparison; if not, we consider the translation $(t_x,0)$ more completely, by actually comparing the translated pattern with the appropriate portion of T. Now, to consider all translations $(t_x,1)$, we subtract $C[x,0]$ from $C[x,P_h]$, recompute the top row of C to be the pixel counts from row $P_h$ of T, and add these new counts into $C[x,P_h]$. The last row of C now contains the counts we need to evaluate $(t_x,1)$, for all $t_x$. To consider further rows of translations, the oldest row sums of C are subtracted from that last row of C. The new row sums of T are calculated (and stored in the C row we just subtracted) and added to the last row of C. Keeping track of these pixel counts (and using them to avoid explicit comparison for some translations) can thus be done in a constant number of operations per translation in the region of interest.

If even the memory required to hold C is too great, we can use another method. This method (also a standard box-filtering technique) uses no extra memory and keeps a running total of "on" points in the window of comparison between P and T as P moves across T in vertical boustrophedonic order (top to bottom, then bottom to top on the next column, then top to bottom on the next column, and so on). As we move down(up), we add to the running sum the sum of the "on" bits in the new bottom(top) row of the window, and subtract out the old top(bottom) row. Movements left to right can add to the running sum the new right column and subtract out the old left column. The reason for choosing vertical rather than horizontal scanning is that counting the number of "on" pixels in a given row of the window involves touching less memory than counting the number of "on" pixels in a column of the window. While this method involves $O(P_w)$ work per translation to update the running sum, in practice this might be a very cheap operation: if the pattern is less than a machine word wide, then only a couple of words need to be fetched from memory to perform the update.

Conclusion

A new, computationally efficient method of pattern detection and recognition has been described. The inventive method can be embodied in hardware configurations that include both general-purpose computers and special-purpose image processing devices. The method is particularly suitable for locating an instance of a binary pattern within a binary image.

The present invention provides techniques forperforming image searches based on the Hausdorff distance. These techniques are especially suited to very fast (tens of milliseconds) implementations, which is an increase in speed of at least an order of magnitude over implementations using previously known techniques. This increase in speed makes it possible to apply this powerful similarity function in new domains; such applications are not practical without the techniques described here.

The uses of the inventive method are many. For example, the method can find application in image analysis tasks such as detecting marks of known shape in scanned documents (e.g., drill-press instructions or other symbols as discussed above in the Background section), or document processing tasks such as optical character recognition (OCR). It can also be used in other kinds of pattern-analysis tasks. For example, it can be used by particle physicists in data analysis to detect particular particle traces in a cloud chamber. Still further, it can be used in machine vision applications, to search an image for a particular shape that occurs, if at all, at an unknown position within the image. Yet further, the method is applicable to transformation spaces other than translation.

These are just some of the uses and embodiments of the invention, and many others are possible. Accordingly, the scope of the invention is not limited by the above description, but instead is given by the appended claims and their full range of equivalents.

We claim:

1. A method comprising the steps of:
   receiving as a first input to a processor a pattern to be recognized in an image;
   receiving as a second input to the processor a digital image in which the pattern is to be recognized;
   performing a preprocessing of the digital image with the processor so as to produce a set of preprocessed digital images, the preprocessing including a plurality of morphological dilation operations, wherein at least one of the plurality of morphological dilation operations calculates a preprocessed digital image representative of a thresholded distance transform of the digital image;
   performing a hierarchical search for the pattern in the preprocessed digital image with the processor, the hierarchical search producing an outcome, the hierarchical search being performed over a search space, the hierarchical search comprising a plurality of decisions, each decision indicating whether a portion of the search space can be eliminated from the search, each decision being made by performing a plurality of comparisons between the pattern and the preprocessed digital images of the set to produce a plurality of comparison results and analyzing the comparison results thus produced; and
   outputting from the processor an outcome of the hierarchical search.

2. The method of claim 1 wherein the comparisons performed during the hierarchical search step are nonpointwise comparisons.

3. The method of claim 1 wherein:
   the pattern comprises a plurality of words of binary data, each word comprising a fixed number of bits, each bit having a value selected from the group 0 or 1; and
   each comparison performed during the hierarchical search step comprises a wordwise comparison operation, the wordwise comparison operation providing a comparison between an entire word of binary data of the pattern and a portion of one of the preprocessed digital images, all the bits of the entire word being processed by the processor together during the wordwise comparison, without any individual consideration by the processor of the value of any individual bit of the entire word.

4. The method of claim 3 wherein the wordwise comparison operation comprises:
   a logical AND operation performed on first and second operands, the first operand being the entire word, the second operand being a portion of one of the preprocessed digital images, the logical AND operation yielding a first result; and
   a bit count operation performed on the first result, the bit count operation comprising a count of how many bits in the first result have a value of 1, the bit count operation yielding a second result.

5. The method of claim 1 wherein one of the morphological dilation operations of the plurality of morphological dilation operations used to calculate the thresholded distance transform comprises a morphological dilation with a circular structuring element.

6. The method of claim 5 wherein the circular structuring element has an associated radius, and additionally comprising the steps of:

accepting into the processor a threshold distance as an input value from the user; and setting the radius of the circular structuring element with the processor according to the input value thus accepted.

7. The method of claim 1 wherein one of the morphological dilation operations of the plurality of morphological dilation operations comprises a morphological dilation with a rectangular structuring element.

8. The method of claim 7 wherein the rectangular structuring element has an associated linear dimension, the hierarchical search traverses a search tree having a plurality of levels, the preprocessing step includes a step of automatically determining a collection of parameter values associated with a level of the hierarchical search to be performed during the search step; and additionally comprising the steps of:

computing with the processor a linear dimension value according to the parameter values of the collection; and setting the linear dimension of the rectangular structuring element according to the linear dimension value thus computed.

9. The method of claim 1 wherein the comparisons performed during the hierarchical search step are performed in an order dependent on a density ordering of the pattern.

10. A method comprising the steps of:

receiving as a first input to a processor a pattern to be recognized in an image;

receiving as a second input to the processor a digital image in which the pattern is to be recognized;

performing a preprocessing of the digital image with the processor so as to produce a set of preprocessed digital images;

performing a hierarchical search for the pattern in the digital image with the processor, the hierarchical search producing an outcome, the hierarchical search being performed over a search space, the hierarchical search comprising a plurality of decisions, each decision indicating whether a portion of the search space can be eliminated from the search, each decision being made by performing a plurality of nonpointwise comparisons between the pattern and the preprocessed digital images of the set producing aplurality of comparison results and analyzing the comparison results thus produced, the comparisons for each decision being performed in an order dependent on a density ordering of the pattern, with the results of early comparisons for the decision being used to determine whether to perform later comparisons for the decision; and outputting a result of the search from the processor.

11. The method of claim 10 wherein:

the pattern includes a plurality of pixel groups, each pixel group of the pattern having a population density; and the density ordering comprises an ordering of the groups according to the population density of each group.

12. The method of claim 11 wherein the density ordering comprises an ordering of the groups according to decreasing population density, such that a first group precedes a second group in the ordering if and only if the population density of the first group is not less than the population density of the second group.

13. The method of claim 10 wherein the preprocessing step includes a plurality of morphological dilation operations.

14. The method of claim 13 wherein one of the morphological dilation operations of the plurality of morphological dilation operations comprises a morphological dilation with a circular structuring element.

15. The method of claim 13 wherein one of the morphological dilation operations of the plurality of morphological dilation operations comprises a morphological-dilation with a rectangular structuring element.

16. The method of claim 10 wherein the preprocessing step includes a thresholded distance transform operation.

17. A method comprising the steps of:

receiving as a first input to a processor a pattern to be recognized in an image;

receiving as a second input to the processor a digital image in which the pattern is to be recognized, the digital image comprising an array of image elements;

performing a dilation of the digital image with the processor so as to produce a dilated digital image;

determining with the processor from the dilated image a set of densities;

performing a nonhierarchical search for the pattern in the digital image with the processor, the search comprising a plurality of evaluations carried out to evaluate transformations of the pattern with respect to the digital image, each evaluation comprising a density checking test and optionally further comprising a plurality of comparisons between the pattern and the dilated digital image, the density checking test being carried out by the processor with reference to the set of densities, the plurality of comparisons between the pattern and the dilated digital image being performed if and only if the density checking test is passed; and outputting a result of the search from the processor.

18. The method of claim 17 wherein the step of performing the dilation of the digital image comprises performing a plurality of morphological dilation operations.

19. The method of claim 18 wherein one of the morphological dilation operations of the plurality of morphological dilation operations comprises a morphological dilation with a circular structuring element.

20. The method of claim 17 wherein the step of performing the dilation of the digital image comprises performing a thresholded distance transform operation.

21. The method of claim 17 wherein the comparisons performed are non-pointwise comparisons.

22. The method of claim 21 wherein the comparisons of the plurality are performed in an order dependent on a density ordering of the pattern.

23. A system comprising:

a processor;

a memory operatively coupled to the processor;

a user interface operatively coupled to the processor;

first input means for receiving in the memory and making available to the processor a pattern to be recognized;

second input means for receiving in the memory and making available to the processor a digital image in which the pattern is to be recognized;

means for preprocessing the digital image with the processor by applying a plurality of morphological dilation operations to the digital image, thereby producing a set of preprocessed digital images representative of at least one thresholded distance transform of the digital image;

means for performing a hierarchical search for the pattern in the digital image with the processor, the hierarchical search producing an outcome, the hierarchical search being performed over a search space, the hierarchical search comprising a plurality of decisions, each decision indicating whether a portion of the search space can be eliminated from the search, each decision being made by performing a plurality of comparisons between the pattern and the preprocessed digital images of the set to produce a plurality of comparison results and analyzing the comparison results thus produced; and means for outputting the search outcome by providing the search outcome from the processor to the user interface.

* * * * *